(12) United States Patent
Dowski, Jr. et al.

(10) Patent No.: US 7,732,750 B2
(45) Date of Patent: *Jun. 8, 2010

(54) WAVEFRONT CODING INTERFERENCE CONTRAST IMAGING SYSTEMS

(75) Inventors: Edward Raymond Dowski, Jr., Lafayette, CO (US); Carol Jean Cogswell, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 320 days.

This patent is subject to a terminal disclaimer.

(21) Appl. No.: 11/514,768

(22) Filed: Sep. 1, 2006

(65) Prior Publication Data

US 2007/0001105 A1    Jan. 4, 2007

Related U.S. Application Data

(63) Continuation of application No. 10/355,761, filed on Jan. 31, 2003, now Pat. No. 7,115,849, which is a continuation of application No. 09/875,766, filed on Jun. 6, 2001, now abandoned, application No. 11/514,768, which is a continuation-in-part of application No. 09/070,969, filed on May 1, 1998, now Pat. No. 7,218,448, which is a continuation-in-part of application No. 08/823,894, filed on Mar. 17, 1997, now Pat. No. 5,748,371, which is a continuation of application No. 08/384,257, filed on Feb. 3, 1995, now abandoned.

(51) Int. Cl.
 *H01J 3/14* (2006.01)
 *G01J 1/20* (2006.01)
 *G01B 9/02* (2006.01)
 *G02B 5/18* (2006.01)

(52) U.S. Cl. ............... 250/216; 250/201.9; 356/493; 359/558

(58) Field of Classification Search .............. 250/216, 250/201.9, 206.2, 208.6, 201.7, 201.8, 201.3; 359/11, 15, 16, 19, 20, 29, 206, 246, 281, 359/368, 370–373, 558–559, 563–564; 356/453, 356/457, 458, 491–494, 498–499, 512, 450, 356/488

See application file for complete search history.

(56) References Cited

U.S. PATENT DOCUMENTS

| | | |
|---|---|---|
| 2,959,105 A | 11/1960 | Sayanagi |
| 3,054,898 A | 9/1962 | Westover et al. |
| 3,305,294 A | 2/1967 | Alvarez |
| 3,583,790 A | 6/1971 | Baker |
| 3,614,310 A | 10/1971 | Korpel |
| 3,856,400 A | 12/1974 | Hartmann et al. |
| 3,873,958 A | 3/1975 | Whitehouse |
| 4,062,619 A | 12/1977 | Hoffman |
| 4,082,431 A | 4/1978 | Ward, III |
| 4,174,885 A | 11/1979 | Joseph et al. |
| 4,178,090 A | 12/1979 | Marks et al. |
| 4,255,014 A | 3/1981 | Ellis |
| 4,275,454 A | 6/1981 | Klooster, Jr. |
| 4,276,620 A | 6/1981 | Kahn et al. |
| 4,308,521 A | 12/1981 | Casasent et al. |
| 4,349,277 A | 9/1982 | Mundy et al. |
| 4,466,067 A | 8/1984 | Fontana |
| 4,480,896 A | 11/1984 | Kubo et al. |
| 4,573,191 A | 2/1986 | Kidode et al. |
| 4,575,193 A | 3/1986 | Greivenkamp, Jr. |
| 4,580,882 A | 4/1986 | Nuchman et al. |
| 4,589,770 A | 5/1986 | Jones et al. |
| 4,642,112 A | 2/1987 | Freeman |
| 4,650,292 A | 3/1987 | Baker et al. |
| 4,655,565 A | 4/1987 | Freeman |
| 4,725,881 A | 2/1988 | Buchwald |
| 4,734,702 A | 3/1988 | Kaplan |
| 4,744,658 A * | 5/1988 | Holly ........................ 356/491 |
| 4,794,550 A | 12/1988 | Greivenkamp, Jr. |
| 4,804,249 A | 2/1989 | Reynolds et al. |
| 4,825,263 A | 4/1989 | Desjardins et al. |
| 4,827,125 A | 5/1989 | Goldstein |
| 4,843,631 A | 6/1989 | Steinpichler et al. |
| 4,936,661 A | 6/1990 | Betensky et al. |
| 4,964,707 A * | 10/1990 | Hayashi ..................... 359/371 |
| 4,989,959 A | 2/1991 | Plummer |
| 5,003,166 A | 3/1991 | Girod |

| | | |
|---|---|---|
| 5,076,687 A | 12/1991 | Adelson |
| 5,102,223 A | 4/1992 | Uesugi et al. |
| 5,128,874 A | 7/1992 | Bhanu et al. |
| 5,142,413 A | 8/1992 | Kelly |
| 5,159,474 A * | 10/1992 | Franke et al. ............... 359/29 |
| 5,165,063 A | 11/1992 | Strater et al. |
| 5,166,818 A | 11/1992 | Chase et al. |
| 5,193,124 A | 3/1993 | Subbarao |
| 5,218,471 A | 6/1993 | Swanson et al. |
| 5,243,351 A | 9/1993 | Rafanelli et al. |
| 5,248,876 A | 9/1993 | Kerstens et al. |
| 5,260,727 A | 11/1993 | Eisner et al. |
| 5,270,825 A | 12/1993 | Takasugi et al. |
| 5,270,861 A | 12/1993 | Estelle |
| 5,270,867 A | 12/1993 | Estelle |
| 5,280,388 A | 1/1994 | Okayama |
| 5,299,275 A | 3/1994 | Jackson et al. |
| 5,301,241 A | 4/1994 | Kirk |
| 5,307,175 A | 4/1994 | Seachman |
| 5,317,394 A | 5/1994 | Hale et al. |
| 5,337,181 A | 8/1994 | Kelly |
| 5,426,521 A | 6/1995 | Chen et al. |
| 5,438,366 A | 8/1995 | Jackson et al. |
| 5,442,394 A | 8/1995 | Lee |
| 5,444,574 A | 8/1995 | Ono et al. |
| 5,465,147 A | 11/1995 | Swanson |
| 5,473,473 A | 12/1995 | Estelle et al. |
| 5,476,515 A | 12/1995 | Kelman et al. |
| 5,521,695 A | 5/1996 | Cathey, Jr. et al. |
| 5,532,742 A | 7/1996 | Kusaka et al. |
| 5,555,129 A | 9/1996 | Konno et al. |
| 5,565,668 A | 10/1996 | Reddersen et al. |
| 5,568,197 A | 10/1996 | Hamano |
| 5,572,359 A | 11/1996 | Otaki et al. |
| 5,610,684 A | 3/1997 | Shiraishi |
| 5,627,664 A * | 5/1997 | Trisnadi ............... 359/11 |
| 5,640,206 A | 6/1997 | Kinoshita et al. |
| 5,706,139 A | 1/1998 | Kelly |
| 5,748,371 A * | 5/1998 | Cathey et al. ............... 359/558 |
| 5,751,475 A | 5/1998 | Ishiwata et al. |
| 5,756,981 A | 5/1998 | Roustaei et al. |
| 5,870,179 A | 2/1999 | Cathey, Jr. et al. |
| 5,969,853 A | 10/1999 | Takaoka |
| 5,969,855 A | 10/1999 | Ishiwata et al. |
| 6,021,005 A | 2/2000 | Cathey, Jr. et al. |
| 6,025,873 A | 2/2000 | Nishioka et al. |
| 6,034,814 A | 3/2000 | Otaki |
| 6,037,579 A | 3/2000 | Chan et al. |
| 6,069,738 A | 5/2000 | Cathey, Jr. et al. |
| 6,091,548 A | 7/2000 | Chen |
| 6,097,856 A | 8/2000 | Hammond, Jr. |
| 6,121,603 A | 9/2000 | Hang et al. |
| 6,128,127 A | 10/2000 | Kusaka |
| 6,144,493 A | 11/2000 | Okuyama et al. |
| 6,172,723 B1 | 1/2001 | Inoue et al. |
| 6,172,799 B1 | 1/2001 | Raj |
| 6,208,451 B1 | 3/2001 | Itoh |
| 6,218,679 B1 | 4/2001 | Takahara et al. |
| 6,219,113 B1 | 4/2001 | Takahara |
| 6,248,988 B1 | 6/2001 | Krantz |
| 6,285,345 B1 | 9/2001 | Crossland et al. |
| 6,288,382 B1 | 9/2001 | Ishihara |
| 6,337,472 B1 | 1/2002 | Garner et al. |
| 7,115,849 B2 * | 10/2006 | Dowski et al. ............ 250/201.9 |
| 2002/0118457 A1 | 8/2002 | Dowski, Jr. |
| 2002/0134921 A1 | 9/2002 | Cathey, Jr. |
| 2003/0127584 A1 | 7/2003 | Dowski, Jr. et al. |
| 2004/0145808 A1 | 7/2004 | Cathey, Jr. et al. |
| 2004/0190762 A1 | 9/2004 | Dowski, Jr. et al. |
| 2004/0228005 A1 | 11/2004 | Dowski, Jr. |
| 2004/0257543 A1 | 12/2004 | Dowski, Jr. et al. |
| 2005/0088745 A1 | 4/2005 | Cathey, Jr. et al. |

FOREIGN PATENT DOCUMENTS

| | | |
|---|---|---|
| EP | 0531926 B1 | 3/1993 |
| EP | 0584769 B1 | 3/1994 |
| EP | 0618473 A2 | 10/1994 |
| EP | 0742466 A | 11/1996 |
| EP | 0759573 A2 | 2/1997 |
| EP | 0791846 | 8/1997 |
| EP | 0791846 A2 | 8/1997 |
| EP | 0981245 A2 | 2/2000 |
| GB | 2278750 A | 12/1994 |
| JP | 2000-98301 A | 4/2000 |
| WO | WO 99/35529 | 7/1999 |
| WO | WO 99/57599 | 11/1999 |
| WO | WO 00/52516 | 9/2000 |
| WO | WO 01/99431 A2 | 12/2001 |
| WO | WO 02/19723 | 3/2002 |
| WO | WO 02/052331 A3 | 7/2002 |
| WO | WO 02/057832 A3 | 7/2002 |
| WO | WO 02/099511 | 12/2002 |
| WO | WO 03/009041 A3 | 1/2003 |
| WO | WO 03/021333 A1 | 3/2003 |
| WO | WO 03/052492 | 6/2003 |
| WO | WO 03/073153 A1 | 9/2003 |
| WO | WO 2005/054927 | 6/2005 |

OTHER PUBLICATIONS

Office Action dated May 17, 1996 issued in related U.S. Appl. No. 08/384,257.

Response to Office Action dated May 17, 1996 issued in related U.S. Appl. No. 08/384,257 dated Sep. 26, 1996.

Notice of Allowance dated Dec. 17, 1996 issued in related U.S. Appl. No. 08/384,257.

Notice of Abandonment dated Jun. 6, 1997 issued in related U.S. Appl. No. 08/384,257.

Interview Summary dated Dec. 23, 1997 issued in related U.S. Appl. No. 08/823,894.

Notice of Allowance dated Jan. 6, 1998 issued in related U.S. Appl. No. 08/823,894.

Office Action dated May 24, 1999 issued in related U.S. Appl. No. 09/070,969.

Response to Office Action dated May 24, 1999 issued in related U.S. Appl. No. 09/070,969, filed Jul. 7, 1999.

Office Action dated Apr. 17, 2000 issued in related U.S. Appl. No. 09/070,969.

Response to Office Action dated Apr. 17, 2000 issued in related U.S. Appl. No. 09/070,969, filed Jul. 17, 2000.

Office Action dated Sep. 20, 2000 issued in related U.S. Appl. No. 09/070,969.

Response to Office Action dated Sep. 20, 2000 issued in related U.S. Appl. No. 09/070,969, filed Nov. 3, 2000.

Advisory Action dated Nov. 14, 2000 issued in related U.S. Appl. No. 09/070,969.

Response to Advisory Action dated Nov. 14, 2000 issued in related U.S. Appl. No. 09/070,969, filed Dec. 4, 2000.

Office Action dated Dec. 26, 2000 issued in related U.S. Appl. No. 09/070,969.

Response to Office Action dated Dec. 26, 2000 issued in related U.S. Appl. No. 09/070,969, filed Aug. 6, 2002.

Office Action dated Jul. 21, 2003 issued in related U.S. Appl. No. 09/070,969.

Response to Office Action dated Jul. 21, 2003 issued in related U.S. Appl. No. 09/070,969, filed Jan. 16, 2004.

Office Action dated Mar. 17, 2004 issued in related U.S. Appl. No. 09/070,969.

Response to Office Action dated Mar. 17, 2004 issued in related U.S. Appl. No. 09/070,969, filed Aug. 17, 2004.

Office Action dated Nov. 9, 2004 issued in related U.S. Appl. No. 09/070,969.

Response to Office Action dated Nov. 9, 2004 issued in related U.S. Appl. No. 09/070,969, filed May 9, 2005.

Office Action dated Jul. 15, 2005 issued in related U.S. Appl. No. 09/070,969.
Response to Office Action dated Jul. 15, 2005 issued in related U.S. Appl. No. 09/070,969, filed Jan. 17, 2006.
Office Action dated Mar. 31, 2006 issued in related U.S. Appl. No. 09/070,969.
Response to Office Action dated Mar. 31, 2006 issued in related U.S. Appl. No. 09/070,969, filed Oct. 2, 2006.
Office Action dated Jan. 16, 2007 issued in related U.S. Appl. No. 09/070,969.
Response to Office Action dated Jan. 16, 2007 issued in related U.S. Appl. No. 09/070,969, filed Feb. 22, 2007.
Notice of Allowance dated Mar. 12, 2007 issued in related U.S. Appl. No. 09/070,969.
Office Action dated Nov. 5, 2004 issued in related U.S. Appl. No. 10/758,740.
Response to Office Action dated Nov. 5, 2004 issued in related U.S. Appl. No. 10/758,740, filed May 5, 2005.
Office Action dated Jul. 8, 2005 issued in related U.S. Appl. No. 10/758,740.
Response to Office Action dated Jul. 8, 2005 issued in related U.S. Appl. No. 10/758,740, filed Jan. 9, 2006.
Office Action dated Mar. 20, 2006 issued in related U.S. Appl. No. 10/758,740.
Response to Office Action dated Mar. 20, 2006 issued in related U.S. Appl. No. 10/758,740, filed May 19, 2006.
Advisory Action dated Jun. 9, 2006 issued in related U.S. Appl. No. 10/758,740.
Appeal Brief filed May 21, 2007 issued in related U.S. Appl. No. 10/758,740.
International Search Report issued on Sep. 20, 1999 in related PCT Application PCT/US99/09546.
Written Opinion issued on Feb. 2, 2000 in related PCT Application PCT/US99/09546.
International Preliminary Examination Report issued on Jun. 29, 2000 in related PCT Application PCT/US99/09546.
P. Potuluri, et al., "High Depth Of Field Microscopic Imaging Using An Interferometric Camera" Optics Express, vol. 8, No. 11, pp. 624-630, May 21, 2001.
Notice of Allowance issued Jul. 26, 2005 in related U.S. Appl. No. 10/355,761.
Office Action issued Aug. 19, 2004 in related U.S. Appl. No. 10/364,552.
Response to Office Action issued Aug. 19, 2004 in related U.S. Appl. No. 10/364,552, filed Jan. 5, 2005.
Notice of Allowance issued Feb. 16, 2005 in related U.S. Appl. No. 10/364,552.
Abstract of JP 60247611 A, published Jul. 12, 1985 (Toshiba KK), Patent Abstracts of Japan, May 6, 1986, vol. 010, No. 119 (p-435), 1 page.
Bradburn, Sarah, Cathey, Wade Thomas and Dowski, Edward R., Jr., "Realizations of focus invariance in optical-digital systems with wave-front coding", Applied Optics vol. 36, No. 35, Dec. 10, 1997, pp. 9157-9166.
C. J Cogswell, N. I. Smith, K. G. Larkin, and P. Hariharan, "Quantitative DIC microscopy using a geometric phase shifter", SPIE, vol. 2984, p. 72-81,1997.
C. J. Cogswell and C. J. R. Sheppard, "Confocal differential interference contrast (DIC) microscopy: including a theoretical analysis of conventional and confocal DIC imaging", Journal of Microscopy, vol. 165, part 1, p. 81-101, Jan. 1992.
C. Varamit, and G. Indebetouw, "Imaging properties of defocused partitioned pupils", J. Opt. Soc. Am. A, vol. 2, No. 6, p. 799-802, Jun. 1985.
C. Wust and D. W. Capson, "Surface profile measurement using color fringe projection", Machine Vision and Applications, vol. 4, p. 193-203, 1991.
D. Kermisch, "Partially coherent image processing by laser scanning", Journal of the Optical Society of America, vol. 65, No. 8, p. 887-891, Aug. 1975.
D. Kermisch, "Principle of equivalence between scanning and conventional optical imaging systems", J. Opt. Soc. Am, vol. 67, No. 10, p. 1357-1360, Oct. 1977.

D. L. Marks, R. A. Stack, D. J. Brady, and J. Van Der Gracht, "Three-dimensional tomography using a cubic-phase plate extended depth-of-field system", Optics Letters, vol. 24, No. 4, p. 253-255, Feb. 15, 1999.
E. R. Dowski Jr., and W. T. Cathey, "Single lens single-image incoherent passive-ranging systems", Applied Optics, vol. 33, No. 29, p. 6762-6773, Oct. 10, 1994.
E. R. Dowski, Jr, and W. T. Cathey, "Extended depth of field through wave-front coding", Applied Optics, vol. 34, No. 11, p. 1859-1866, Apr. 10, 1995.
G. E. Johnson, E. R. Dowski, Jr, and W. T. Cathey, "Passive ranging through wave-front coding: information and application", Applied Optics, vol. 39, No. 11, p. 1700-1710, Apr. 10, 2000.
G. Hausler, "A method to increase the depth of focus by two step image processing", Optical Communications, vol. 6, No. 1, p. 38-42, Sep. 1972.
G. Hausler, and E. Korner, "Imaging with expanded depth of focus", Zeiss Inform, Oberkochen, 29, No. 98E, p. 9-13 (1986/1987).
G. Indebetouw, and H. Bai, "Imaging with Fresnel zone pupil masks: extended depth of field", Applied Optics, vol. 23, No. 23, p. 4299-4302, Dec. 1, 1984.
G. Y. Sirat, "Conoscopic holography. I. Basic principles and physical basis", J. Opt. Soc. Am. A, vol. 9, No. 1, p. 70-90, Jan. 1992.
H. B. Wach, E. R. Dowski,Jr., and W. T. Cathey, "Control of chromatic focal shift through wave-front coding", Applied Optics, vol. 37, No. 23, p. 5359-5367, Aug. 10, 1998.
H. Bartelt, J. Ojeda-Castaneda, and E. E. Sicre, "Misfocus tolerance seen by simple inspection of the ambiguity function", Applied Optics, vol. 23, No. 16, p. 2693-2696, Aug. 15, 1984.
H. Wang, and F. Gan, "High focal depth with a pure-phase apodizer", Applied Optics, vol. 40, No. 31, p. 5658-5662, Nov. 1, 2001.
H. Wang, and F. Gan, "Phase-shifting apodizers for increasing focal depth", Applied Optics, vol. 41, No. 25, p. 5263-5266, Sep. 1, 2002.
H. Wei, and T. D. Binnie, "High-resolution image reconstruction for multiple low-resolution images", 7th International Conference on Image Processing and Its Applications, Pub. # 465, vol. 2 p. 596-600 (1999).
Hecht, Eugene, Optics, Second Edition, 1987, pp. 177-181.
J. E. Greivenkamp, "Color dependent optical prefilter for the suppression of aliasing artifacts", Applied Optics, vol. 29, No. 5, p. 676-684, Feb. 10, 1990.
J. M. Schmitt, S. L. Lee and K. M. Yung, "An optical coherence microscope with enhanced resolving power in thick tissue", Optics Communications, vol. 142, p. 203-207, Oct. 15, 1997.
J. Ojeda-Castaneda, and A. Diaz, "High focal depth by quasibifocus", vol. 27, No. 20, p. 4163-4165, Oct. 15, 1988.
J. Ojeda-Castaneda, and L. R. Berriel-Valdos, "Arbitrarily high focal depth with finite apertures", Optics Letters, vol. 13, No. 3, p. 183-185, Mar. 1988.
J. Ojeda-Castaneda, E. Tepichin, and A. Diaz, "Arbitrarily high focal depth with a quasioptimum real and positive transmittance apodizer", Applied Optics, vol. 28, No. 13, p. 2666-2670, Jul. 1, 1989.
J. Ojeda-Castaneda, E. Tepichin, and A. Pons, "Apodization of annular apertures: Strehl ratio", Applied Optics, vol. 27, No. 24, p. 5140-5145, Dec. 15, 1988.
J. Ojeda-Castaneda, L. R. Berriel-Valdos, and E. Montes, "Ambiguity function as a design tool for high focal depth", Applied Optics, vol. 27, No. 4, p. 790-795, Feb. 15, 1988.
J. Ojeda-Castaneda, L. R. Berriel-Valdos, and E. Montes, "Spatial filter for increasing the depth of focus", Optics Letters, vol. 10, No. 11, p. 520-522, Nov. 1985.
J. Ojeda-Castaneda, P. Andres, and A. Diaz, "Annular apodizers for low sensitivity to defocus and to spherical aberration", Optics Letters, vol. 11, No. 8, p. 487-489, Aug. 1986.
J. Ojeda-Castaneda., and L. R. Berriel-Valdos, "Zone plate for arbitrarily high focal depth", Applied Optics, vol. 29, No. 7, p. 994-997, Mar. 1, 1990.
J. Ojeda-Castaneda., R. Ramos and A. Noyola-Isgleas, "High focal depth by apodization and digital restoration", Applied Optics, vol. 27, No. 12, p. 2583-2586, Jun. 15, 1988.
J. T. McCrickerd, "Coherent processing and depth of focus of annular aperture imagery", Applied Optics, vol. 10, No. 10, p. 2226-2230, Oct. 1971.

J. Van Der Gracht, E. R. Dowski Jr., M. G. Taylor, and D. M. Deaver, "Broadband behavior of an optical-digital focus-invariant system", Optics Letters, vol. 21, No. 13, p. 919-921, Jul. 1, 1996.

J.T. McCrickerd, "Coherent processing and depth of focus of annular aperture imagery", Applied Optics, vol. 10, No. 10, p. 2226-2230, Oct. 1971.

K. J. Barnard, E. A. Watson and P. F. McManamon, "Nonmechanical microscanning using optical space-fed phased arrays", Optical Engineering, Vol. 33, No. 9, p. 3063-3071, Sep. 1994.

M. Kawakita, K. Iizuka, T. Aida, H. Kikuchi, H. Fujikake, J. Yonai and K. Takizawa, "Axi-version camera: a three-dimension camera", in Three-dimensional Image Capture and Applications III, Brian D. Corner, Joseph H. Nurre, Editors, Proceedings of SPIE, vol. 3958, p. 61-70, 2000.

M.Mino and Y. Okano, "Improvement in the OTF of a defocused optical system through the use of shade apertures", Applied Optics, vol. 10, No. 10, p. 2219-2225, Oct. 1971.

O'Shea, Donald C. and Harrigan, Michael E., "Chapter 33, Aberration Curves in Lens Design", Handbook of Optics, vol. 1, 1995, pp. 33.1-33.5, McGraw-Hill, New York.

Poon, Ting-Chung and Motamedi, Masoud, "Optical/digital incoherent image processing for extended depth of field", Applied Optics vol. 26, No. 21, Nov. 1, 1987, pp. 4612-4615.

Q-S. Chen and M. S. Weinhous, "Sub-pixel shift with fourier transformation to achieve efficient and high quality image interpolation", SPIE, vol. 2, No. 3661, p. 728-736, Feb. 1999.

R. J. Pieper and A. Korpel, "Image processing for extended depth of field", Applied Optics, vol. 22, No. 10, p. 1449-1453, May 15, 1983.

S. C. Tucker, W. T. Cathey, and E. R. Dowski, Jr, "Extended depth of field and aberration control for inexpensive digital microscope systems", Optics Express, vol. 4, No. 11, p. 467-474, May 24, 1999.

S. Kubo, M. Inui, and Y. Miyake, "Preferred sharpness of photographic color images", Journal of Imaging Science, vol. 29,No. 6, p. 213-215, Nov./Dec. 1985.

S. S. Sherif, E. R. Dowski, Jr and W. T. Cathey, "A logarithmic phase filter to extend the depth of field of incoerent hybrid imaging systems", Applied Optics, in press, Oct. 2002.

S. V. Shatalin, J. B. Tan, R. Juskaitis and T. Wilson, "Polarization contrast imaging of thin films in scanning microscopy", Optics Communications, vol. 116, p. 291-299, May 1, 1995.

Siebert. J. (Officer), International Search Report received in *PCT/US01/26126,mailed*ling date Aug. 20, 2001, Completion Date Jun. 24, 2003. 3 pages.

T. Fukano, "Geometrical cross-sectional imaging by a heterodyne wavelength-scanning interference confocal microscope", Optics Letters, vol. 25, No. 8, p. 548-550, Apr. 15, 2000.

Van Der Gracht, Joseph, Dowski, Edward R., Jr., Cathey, W. Thomas and Bowen, John P., "Aspheric optical elements for extended depth of field imaging", SPIE vol. 2537, pp. 279-288, Aug. 1995.

Veldkamp, Wilfrid B., and McHugh, Thomas J., "Binary Optics", Scientific American, May 1, 1992, vol. 266, No. 5, pp. 50-55.

W. Chi and N. George, "Electronic imaging using a logarithmic asphere", Optics Letters, vol. 26, No. 12, p. 875-877, Jun. 15, 2001.

W. T. Cathey and W. C. Davis, "Imaging system with range to each pixel", J Opt. Soc. Am A, vol. 3, No. 9, p. 1537-1542, Sep. 1986.

W. T. Cathey, B. R. Frieden, W. T. Rhodes, and C. K. Rushforth, "Image gathering and processing for enhanced resolution", J. Opt. Soc. Am. A, vol. 1, No. 3, p. 241-250, Mar. 1984.

W. T. Welford, "Use of annular apertures to increase focal depth", Journal of the Optical Society of America, vol. 50, No. 8, p. 749-753, Aug. 1960.

S. S. Sherif, E. R. Dowski, Jr. and W. T. Cathey, "A logarithmic phase filter to extend the depth of field of incoherent hybrid imaging systems", Applied Optics, in press, Oct. 2002, 8 pages.

Van Der Gracht, Joseph, Dowski, Edward R., Jr., Cathey, W. Thomas and Bowen, John P., "Aspheric optical elements for extended depth of field imaging", SPIE vol. 2537, Aug. 1995, pp. 279-288.

* cited by examiner

*Primary Examiner*—Georgia Y Epps
*Assistant Examiner*—Don Williams
(74) *Attorney, Agent, or Firm*—Lathrop & Gage LLP

(57) ABSTRACT

An interference contrast imaging system images phase objects. The system includes an illumination source, illumination optics, polarizing optics for splitting the illumination into orthogonal polarizations and for recombining the polarizations, objective optics that form an image at a detector, a wavefront coding element and a post processor for processing the image by removing a phase shift imparted by the wavefront coding element. The wavefront coding element has an aperture, is between the phase object and the detector, and provides an altered optical transfer function of the imaging system by imparting the phase shift to the illumination transmitted through the wavefront coding element. The altered optical transfer function is insensitive to an object distance between the phase object and the objective optics over a greater range of object distances than would be provided by an optical transfer function of a corresponding interference contrast imaging system without the wavefront coding element.

10 Claims, 9 Drawing Sheets

WAVEFRONT CODING INTERFERENCE CONTRAST IMAGING SYSTEMS

CROSS-REFERENCE TO RELATED APPLICATIONS

This patent application is a continuation of commonly-owned and U.S. patent application Ser. No. 10/355,761, filed on Jan. 31, 2003, now U.S. Pat. No. 7,115,849 which is a continuation of U.S. patent application Ser. No. 09/875,766, filed on Jun. 6, 2001, now abandoned, both of which applications are incorporated herein by reference.

This patent application is also a continuation-in-part of commonly-owned and U.S. patent application Ser. No. 09/070,969, filed on May 1, 1998 now U.S. Pat. No. 7,218,448; which is a continuation-in-part of U.S. patent application Ser. No. 08/823,894 filed Mar. 17, 1997, now U.S. Pat. No. 5,748,371; which is a continuation of U.S. patent application Ser. No. 08/384,257, filed Feb. 3, 1995, now abandoned, all of which are incorporated herein by reference.

This patent application also relates to commonly-owned and U.S. patent application Ser. No. 09/766,325, filed Jan. 19, 2001, now U.S. Pat. No. 6,783,733, which is incorporated herein by reference.

BACKGROUND OF THE INVENTION

1. Field of the Invention

This invention relates to apparatus and methods for using Wavefront Coding to improve contrast imaging of objects which are transparent, reflective or vary in thickness or index of refraction.

2. Description of the Prior Art

Most imaging systems generate image contrast through variations in reflectance or absorption of the object being viewed. Objects that are transparent or reflective but have variations in index of refraction or thickness can be very difficult to image. These types of transparent or reflective objects can be considered "Phase Objects". Various techniques have been developed to produce high contrast images from essentially transparent objects that have only variations in thickness or index of refraction. These techniques generally modify both the illumination optics and the imaging optics and are different modes of what can be called "Contrast Imaging".

There are a number of different Contrast Imaging techniques that have been developed over the years to image Phase Objects. These techniques can be grouped into three classes that are dependent on the type of modification made to the back focal plane of the imaging objective and the type of illumination method used. The simplest Contrast Imaging techniques modify the back focal plane of the imaging objective with an intensity or amplitude mask. Other techniques modify the back focal plane of the objective with phase masks. Still more techniques require the use of polarized illumination and polarization-sensitive beam splitters and shearing devices.

Contrast Imaging techniques that require polarizers, beam splitters and beam shearing to image optical phase gradients, we call "Interference Contrast" techniques. These techniques include conventional Differential Interference Contrast (Smith, L. W., Microscopic interferometry, Research (London), 8:385-395, 1955), improvements using Nomarski prisms (Allen, R. D., David, G. B, and Nomarski, G, The Zeiss-Nomarski differential interference equipment for transmitted light microscopy, Z. Wiss. Mikrosk. 69:193-221, 1969), the Dyson interference microscope (Born and Wolf, Principals of Optics, Macmillan, 1964), the Jamin-Lebedeff interferometer microscopes as described by Spencer in 1982 ("Fundamentals of Light Microscopy", Cambridge University Press, London), and Mach-Zehnder type interference microscopes ("Video Microscopy", Inoue and Spring, Plenum Press, NY, 1997). Other related techniques include those that use reduced cost beam splitters and polarizers (U.S. Pat. No. 4,964,707), systems that employ contrast enhancement of the detected images (U.S. Pat. No. 5,572,359), systems that vary the microscope phase settings and combine a multiplicity of images (U.S. Pat. No. 5,969,855), and systems having variable amounts of beam shearing (U.S. Pat. No. 6,128,127).

FIG. 1 (Prior Art) is a block diagram 100, which shows generally how Interference Contrast Imaging techniques are implemented. This block diagram shows imaging of a Phase Object 110 through transmission, but those skilled in the art will appreciate that the elements could just as simply have been arranged to show imaging through reflection.

Illumination source 102 and polarizer 104 act to form linearly polarized light. Beam splitter 106 divides the linearly polarized light into two linearly polarized beams that are orthogonally polarized. Such orthogonal beams can be laterally displaced or sheared relative to each other. Illumination optics 108 act to produce focussed light upon Phase Object 110. A Phase Object is defined here as an object that is transparent or reflective but has variations in thickness and/or index of refraction, and thus can be difficult to image because the majority of the image contrast typically is derived from variations in the reflectance or absorption of the object.

Objective lens 112 and tube lens 118 act to produce an image upon detector 120. Beam splitter 114 acts to remove the lateral shear between the two orthogonally polarized beams formed by beam splitter 106. Beam splitter 114 is also generally adjustable. By adjusting this beam splitter a phase difference between the two orthogonal beams can be realized. Analyzer 116 acts to combine the orthogonal beams by converting them to the same linear polarization. Detector 122 can be film, a CCD detector array, a CMOS detector, etc. Traditional imaging, such as bright field imaging, would result if polarizer and analyzer 104 and 116 and beam splitters 106 and 114 were not used.

FIG. 2 (Prior Art) shows a description of the ray path and polarizations through the length of the Interference Contrast imaging system of FIG. 1. The lower diagram of FIG. 2 describes the ray path while the upper diagram describes the polarizations. The illumination light is linearly polarized after polarizer 204. This linear polarization is described as a vertical arrow in the upper diagram directly above polarizer 204. At beam splitter 206 the single beam of light becomes two orthogonally polarized beams of light that are spatially displaced or sheared with respect to each other. This is indicated by the two paths (solid and dotted) in both diagrams. Notice that the two polarization states of the two paths in the top diagram are orthogonally rotated with respect to each other. Beam splitter 214 spatially combines the two polarizations with a possible phase offset or bias. This phase bias is given by the parameter Δ in the upper plot. By laterally adjusting the second beam splitter 214 the value of the phase bias Δ can be changed. A Nomarski type prism is described by the ray path diagram, although a Wollaston type prism could have been used as well. Analyzer 216 acts to convert the orthogonal component beams to linearly polarized light. The angle between the polarizer 204 and analyzer 216 can typically be varied in order to adjust the background intensity. Image plane 218 acts to display or record a time average intensity of the linearly polarized light, the sheared component possibly containing a phase shift. This image plane can be an optical viewing device or a digital detector such as CCD, CMOS, etc.

The interactions of the polarizers, beam splitters, and Phase Objects of the Interference Contrast imaging systems have been studied in great detail. For additional background information see "Confocal differential interference contrast (DIC) microscopy: including a theoretical analysis of conventional and confocal DIC imaging", Cogswell and Sheppard, Journal of Microscopy, Vol 165, Pt 1, January 1992, pp 81-101.

In order to understand the relationship between the object, image, and phase shift $\Delta$ consider an arbitrary spatially constant object that can be mathematically described as:

$$Obj = a \exp(j\theta), \text{ where } j = \sqrt{-1}$$

where "a" is the amplitude and $\theta$ is the object phase. If the two component beams of the system of FIG. 2 have equal amplitude, and if the component beams are subtracted with relative phases $+/-\Delta/2$ then just after analyzer 216 the resulting image amplitude is given by:

$$amp = a \exp(j[\theta-\Delta/2]) - a \exp(j[\theta+\Delta/2]) =$$
$$2j\, a \exp(j\theta)\sin(\Delta/2)$$

The image intensity is the square of the image amplitude. The intensity of this signal is then given by:

$$int_o = 4\, a^2 \sin(\Delta/2)^2.$$

The image intensity is independent of the object phase $\theta$. The phase difference or bias between the two orthogonal beams is given by $\Delta$ and is adjusted by lateral movement of the beam splitter, be it a Wollaston or a Nomarski type. If instead of a spatially constant object, consider an object whose phase varies by $\Delta\phi$ between two laterally sheared beams. This object phase variation is equivalent to a change in the value of the component beam phases of $\Delta$. If the component beam phases $\Delta$ is equal to zero (no relative phase shift) then the resulting image intensity can be shown to have increases in intensity for both positive and negative variations of object phase. If the component beam bias is increased so that the total phase variation is always positive, the change in image intensity then increases monotonically throughout the range $\Delta\phi$. The actual value of the change in image intensity with object phase change $\Delta\phi$ can be shown to be:

$$Int_1 = 4\, a^2 \Delta\phi \sin(\Delta).$$

In Interference Contrast imaging the phase bias $\Delta$ determines the relative strengths with which the phase and amplitude information of the object will be displayed in the image. If the object has amplitude variations these will be imaged according to into above. At a phase bias of zero (or multiple of 2 pi) the image will contain a maximum of phase information but a minimum of amplitude information. At a phase bias of pi the opposite is true, with the image giving a maximum of amplitude information of the object and a minimum of phase information. For intermediate values of phase bias both phase and amplitude are imaged and the typical Interference Contrast bias relief image is produced, as is well known.

Variation of the phase bias can be shown to affect the parameters of image contrast, linearity, and signal-to-noise ratio (SNR) as well. The ratio of contrast from phase and amplitude in Interference Contrast imaging can be shown to be given by:

$$[\text{contrast due to phase/contrast due to amplitude}] = 2 \cot(\Delta/2)$$

The overall contrast in the Interference Contrast image is the ratio of the signal strength to the background and can be shown to be given by:

$$\text{overall contrast} = 2\, \Delta\phi \cot(\Delta/2).$$

The linearity between the image intensity and phase gradients in the object can be described by:

$$L = [(1+\sin(\Delta))^{(2/3)}]/[2\cos(\Delta)].$$

The signal-to-noise ratio (SNR), ignoring all sources of noise except shot noise on the background, can be shown to be given by $$SNR = 4\, a \cos(\Delta/2).$$

In Interference Contrast imaging systems the condenser aperture can be opened to improve resolution, although in practice, to maintain contrast, the condenser aperture is usually not increased to full illumination. Imaging is typically then partially coherent. Description of the imaging characteristics for Interference Contrast imaging therefore needs to be expressed in terms of a partially coherent transfer function. The partially coherent transfer function (or transmission cross-coefficient), given as C(m,n;p,q), describes the strength of image contributions from pairs of spatial frequencies components m; p in the x direction and n; q in the y direction (Born and Wolf, Principals of Optics, Macmillan, 1975, p. 526). The intensity of the image in terms of the partially coherent transfer function image can be written as:

$$l(x,y) = \iiiint T(m,n)T(p,g)^* C(m,n;p,q)\exp(2\,pi\,j\,[(m-p)x + (n-q)y])\,dm\,dn\,dp\,dq$$

where the limits of integration are +infinity to -infinity. The term T(m,n) is the spatial frequency content of the object amplitude transmittance t(x,y):

$$T(m,n) = \iint t(x,y)\exp(2\,pi\,j\,[mx+ny])\,dx\,dy$$

where again the limits of integration are +infinity to -infinity. ( )* denotes complex conjugate. When the condenser aperture is maximally opened and matched to the back aperture or exit pupil of the objective lens, the partially coherent transfer function reduces to (Intro. to Fourier Optics, Goodman, 1968, pg.120):

$$C(m, n; p, q) = \delta(m-n)\delta(p-q)[a\cos(\rho) - \rho\, sqrt\{(1-\rho^2)\}]$$

where $\rho = sqrt(m^2+p^2)$ and $\delta(x) = 1$ if $x=0$, $\delta(x) = 0$ otherwise.

The effective transfer function for the Interference Contrast imaging system can be shown to be given as:

$$C(m,n;p,q)_{\mathit{eff}} = 2\, C(m,n;p,q)\{\cos[2\,pi(m-n)\Lambda] - \cos(\Delta)\cos([2\,pi(m+n)\Lambda] - \sin(\Delta)\sin[2\,pi(m+p)\Lambda]\}$$

where $\Lambda$ is equal to the lateral shear of the beam splitters and C(m,n;p,q) is the partially coherent transfer function of the system without Interference Contrast modifications.

Interference Contrast imaging is one of the most complex forms of imaging in terms of analysis and design. These systems are also widely used and studied. But, there is still a need to improve Interference Contrast Imaging of Phase Objects by increasing the depth of field for imaging thick objects, as well as for controlling focus-related aberrations in order to produce less expensive imaging systems than is currently possible.

SUMMARY OF THE INVENTION

An object of the present invention is to improve Contrast Imaging of Phase Objects by increasing depth of field and controlling focus-related aberrations. This is accomplished by using Contrast Imaging apparatus and methods with Wavefront Coding aspheric optics and post processing to increase depth of field and reduce misfocus effects. The general Interference Contrast imaging system is modified with a special purpose optical element and image processing of the detected image to form the final image. Unlike the conventional Interference Contrast imaging system, the final Wavefront Coding Interference Contrast image is not directly available at the image plane. Post processing of the detected image is required. The Wavefront Coding optical element can be fabricated as a separate component, can be constructed as an integral component of the imaging objective, tube lens, beam splitter, polarizer or any combination of such.

Apparatus for increasing depth of field and controlling focus related aberrations in an Interference Contrast Imaging system having an illumination source, optical elements for splitting light polarizations, and illumination optics placed before a Phase Object to be imaged, and elements for recombining light polarizations and objective optics after the Phase Object to form an image at a detector, includes an optical Wavefront Coding mask having an aperture and placed between the Phase Object and the detector, the coding mask being constructed and arranged to alter the optical transfer function of the Interference Contrast Imaging system in such a way that the altered optical transfer function is substantially insensitive to the distance between the Phase Object and the objective optics over a greater range of object distances than was provided by the unaltered optical transfer function, wherein the coding mask affects the alteration to the optical transfer function substantially by affecting the phase of light transmitted by the mask. The system further includes a post processing element for processing the image captured by the detector by reversing the alteration of the optical transfer function accomplished by the coding mask.

The detector might be a charge coupled device (CCD).

The phase of light transmitted by the coding mask is preferably relatively flat near the center of the aperture with increasing and decreasing phase near respective ends of the aperture.

As an alternative, the phase of light transmitted by the coding mask could substantially follow a cubic function.

In one embodiment, the phase of light transmitted by the coding mask substantially follows a function of the form:

Phase $(x,y)=12 [x^3+y^3]$ where $|x|\leq 1$, $|y|\leq 1$.

In another embodiment the phase of light transmitted by the coding mask substantially follows a rectangularly separable sum of powers function of the form:

phase$(x,y)=3 [a_i \text{sign}(x)|x|^{b_i}+c_i \text{sign}(y)|y|^{d_i}]$ where the sum is over the index i, $\text{sign}(x)=-1$ for $x<0$, $\text{sign}(x)=+1$ for $x\geq 0$.

In another embodiment, the phase of light transmitted by the coding mask substantially follows a non-separable function of the form:

phase$(r,\theta)=3[r^{a_i}\cos(b_i\theta+\phi_i)]$ where the sum is again over the index i.

In another embodiment, the phase of light transmitted by the coding mask substantially follows a function of the form:

Phase profile $(x,y)=7[\text{sign}(x)|x|^3+\text{sign}(y)|y|^3]+ 7[\text{sign}(x)|x|^{9.6}+\text{sign}(y)|y|^{9.6}]$ where $|x|\leq 1$, $|y|\leq 1$.

The coding mask further may be integrally formed with a lens element for focussing the light, or with the illumination optics.

The coding mask could comprise an optical material having varying thickness, an optical material having varying index of refraction, spatial light modulators, or micro-mechanical mirrors.

A method for increasing depth of field and controlling focus related aberrations in a conventional Interference Contrast Imaging system comprises the steps of modifying the wavefront of transmitted light between the Phase Object and the detector, the wavefront modification step selected to alter the optical transfer function of the Interference Contrast Imaging system in such a way that the altered optical transfer function is substantially insensitive to the distance between the Phase Object and the objective optics over a greater range of object distances than was provided by the unaltered optical transfer function, and post processing the image captured by the detector by reversing the alteration of the optical transfer function accomplished by the mask.

A Wavefront Coding optical element can also be used on the illumination side of the system in order to extend the depth of field of the projected illumination due to the duality of projection and imaging. This projected illumination would be broader than without Wavefront Coding, but the optical density as a function of distance from the object would be less sensitive with Wavefront Coding than without. Without Wavefront Coding on the illumination side of the system, the object can technically be imaged clearly but is not illuminated sufficiently. See "Principal of Equivalence between Scanning and Conventional Optical Imaging Systems", Dorian Kermisch, J. Opt. Soc. Am., Vol. 67, no. 10, pp. 1357-1360 (1977).

DETAILED DESCRIPTION OF THE PREFERRED EMBODIMENTS

Figure 3:
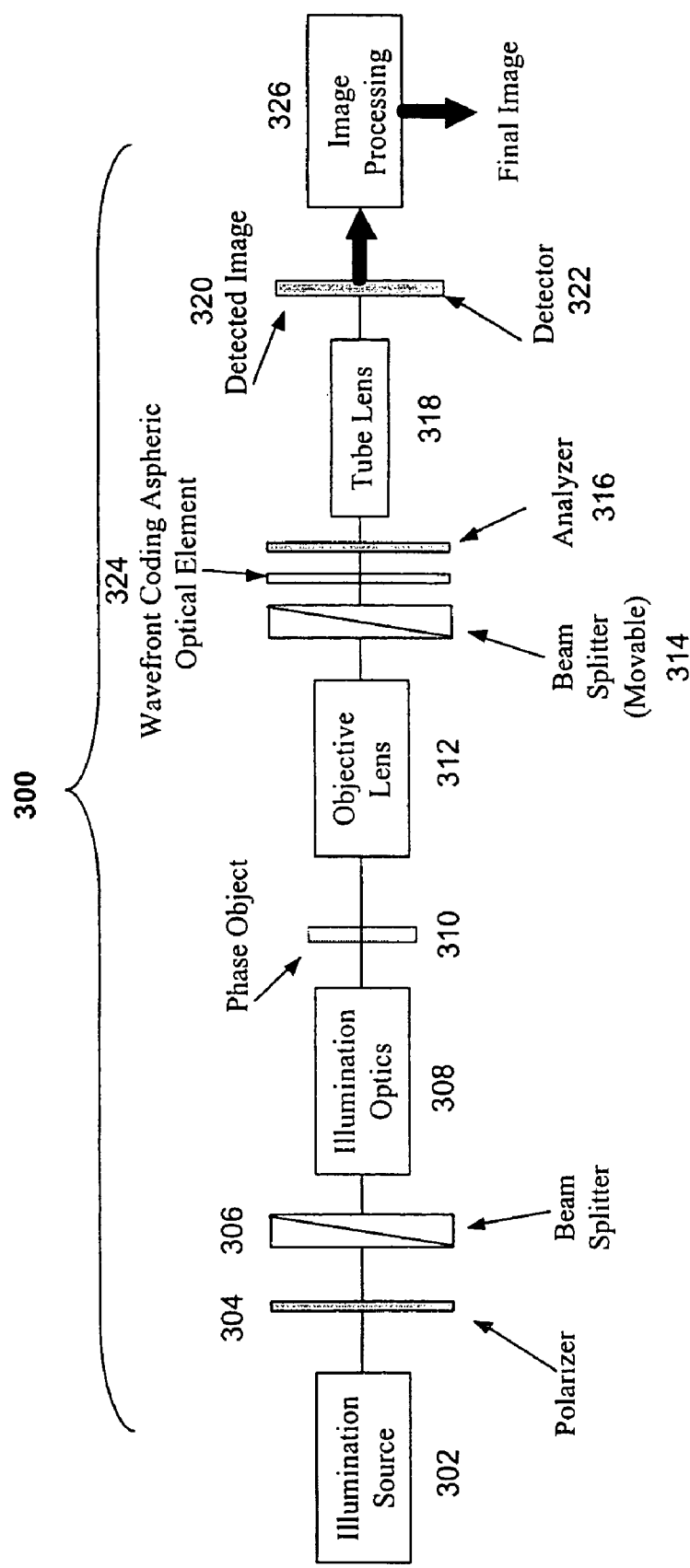
FIG. 3 shows a Wavefront Coding Interference Contrast imaging system including Wavefront Coding optics and post processing in accordance with the present invention.
Figure 4:
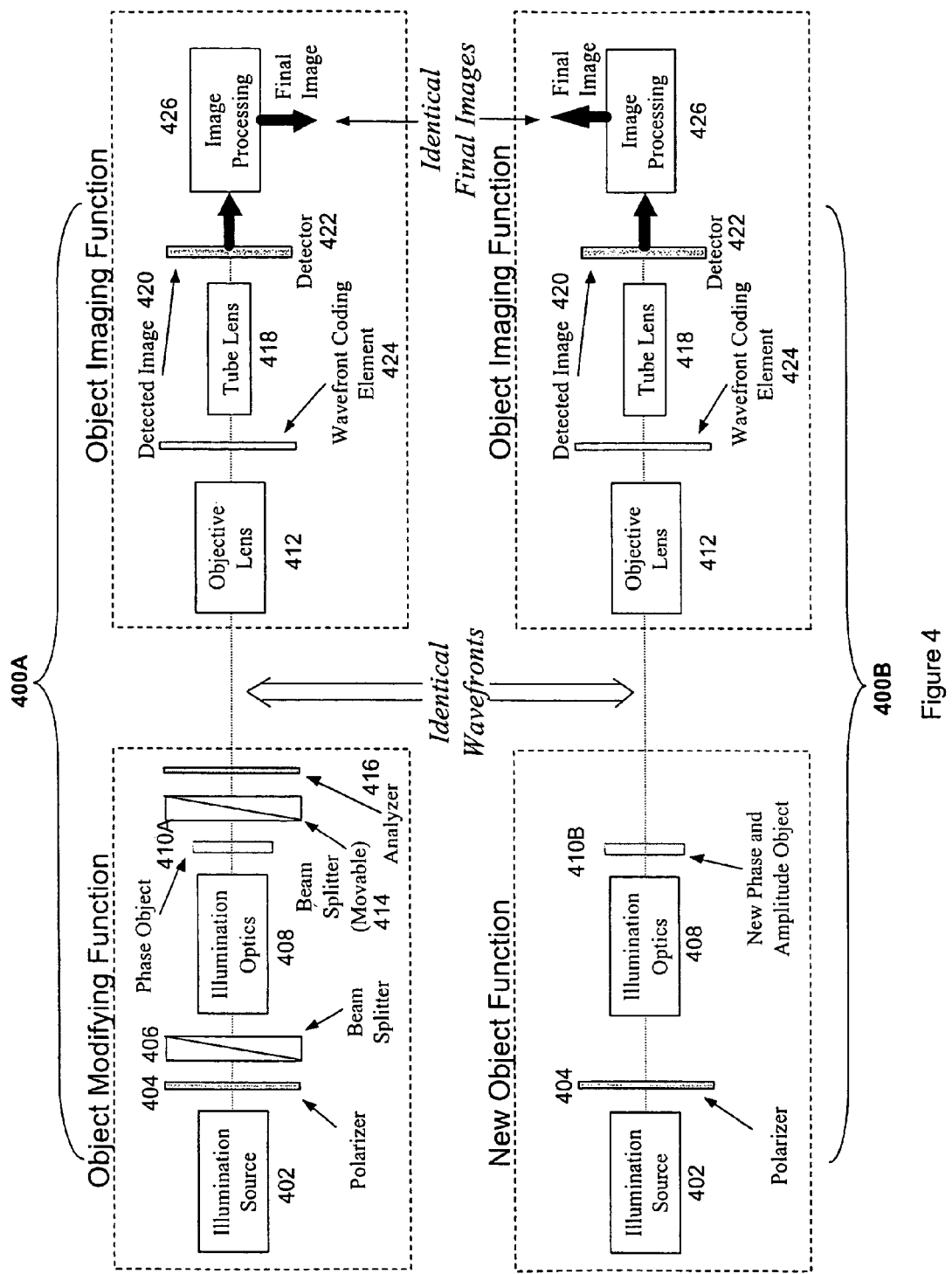
FIG. 4 describes in detail the Object Modifying Function and Object Imaging Function of the Wavefront Coding Interference Contrast system.

Wavefront Coding can be used with conventional objectives, polarizers and beam splitters in Interference Contrast systems, as shown in FIG. 3, to achieve an increased depth of field in an optical and digital imaging system. This can be explained by considering the Object Modifying Functions of conventional Interference Contrast systems separately from the Object Imaging Functions, as shown in FIG. 4. By considering these two functions separately, modification of depth of field can be explained in terms of the Object Imaging Function. Extending the depth of field of the Object Imaging Functions of Interference Contrast systems is shown in FIGS. 5-8. FIG. 9 shows real-world images of human cervical cells taken with a system having only Interference Contrast and a comparison to an image from a Wavefront Coding Interference Contrast system.

Figure 1:
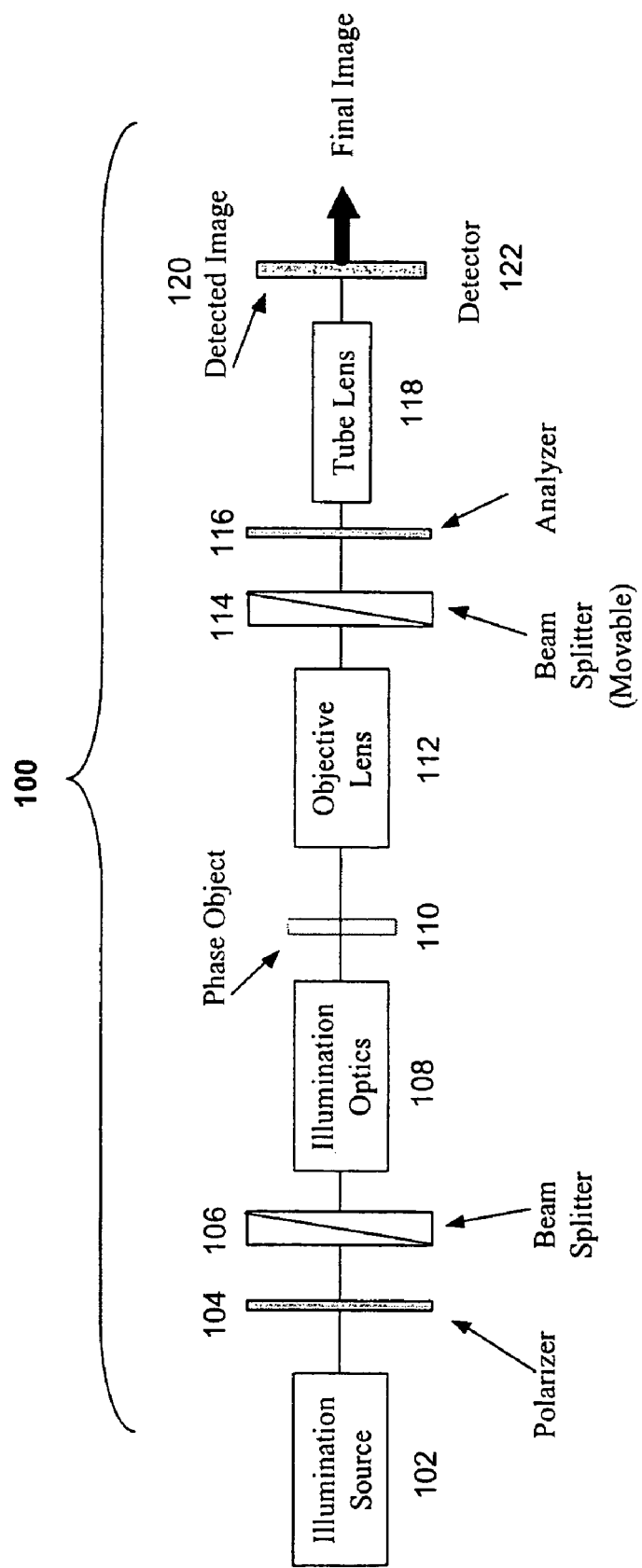
FIG. 1 (prior art) shows a standard prior art Interference Contrast imaging system.

FIG. 3 shows a Wavefront Coded Interference Contrast imaging system 300 including Wavefront Coding and post processing in accordance with the present invention. Similar reference numbers are used in FIG. 3 as are used in FIG. 1, since the systems are very similar, except for the addition of Wavefront Coding element 324 and post processing 326. The general Interference Contrast imaging system of FIG. 1 is modified with a special purpose generalized aspheric optical element 324 and image processing 326 of the detected image to form the final image. Unlike the conventional Interference Contrast system, the final image in combined system 300 is not directly available at detector 322. In fact, no sharp and clear image of any kind is available in system 300, except after image processing 326. Image processing 326 of the detected image is required to remove the spatial Wavefront Coding effects (other than the extended depth of field).

Wavefront Coding optical element 324 can be fabricated as a separate component as shown in FIG. 3, or can be combined with objective lens 312, tube lens 318, beam splitter 314, analyzer 316, or any combination of these. Any material or configuration that can impart a range of spatial phase shifts to a wavefront can be used to construct Wavefront Coding element 324. For example, optical glass or plastic of varying thickness and/or index of refraction can be used. Holograms and mirrors can also be used as the material for the Wavefront Coding element. In order to dynamically adjust the amount of depth of field, or to essentially change the Wavefront Coding element 324 for different objectives or desired depth of field, spatial light modulators or dynamically adjustable micro mirrors or similar can also be used.

Wavefront Coding optical element 324 can also be used on the illumination side of system 300 in order to extend the depth of field of the projected illumination due to the duality of projection and imaging. This projected illumination would be broader than without Wavefront Coding, but the optical density as a function of distance from the object would be less sensitive with Wavefront Coding than without.

The components that distinguish the Wavefront Coding Interference Contrast system of FIG. 3 from a general or brightfield imaging system is polarizer 304, beam splitter 306, beam splitter 314, analyzer 316, and Wavefront Coding element 324 and image processing 326. The polarizer, analyzer, and beam splitters essentially use phase to modify the imaging characteristics of the object 310. The Wavefront Coding element 324 and image processing 326 are used to increase the depth of field or remove misfocus effects in images of the modified object as shown below. By grouping the components of system 300 by their function, the Wavefront Coding Interference Contrast imaging system can be understood.

Figure 2:
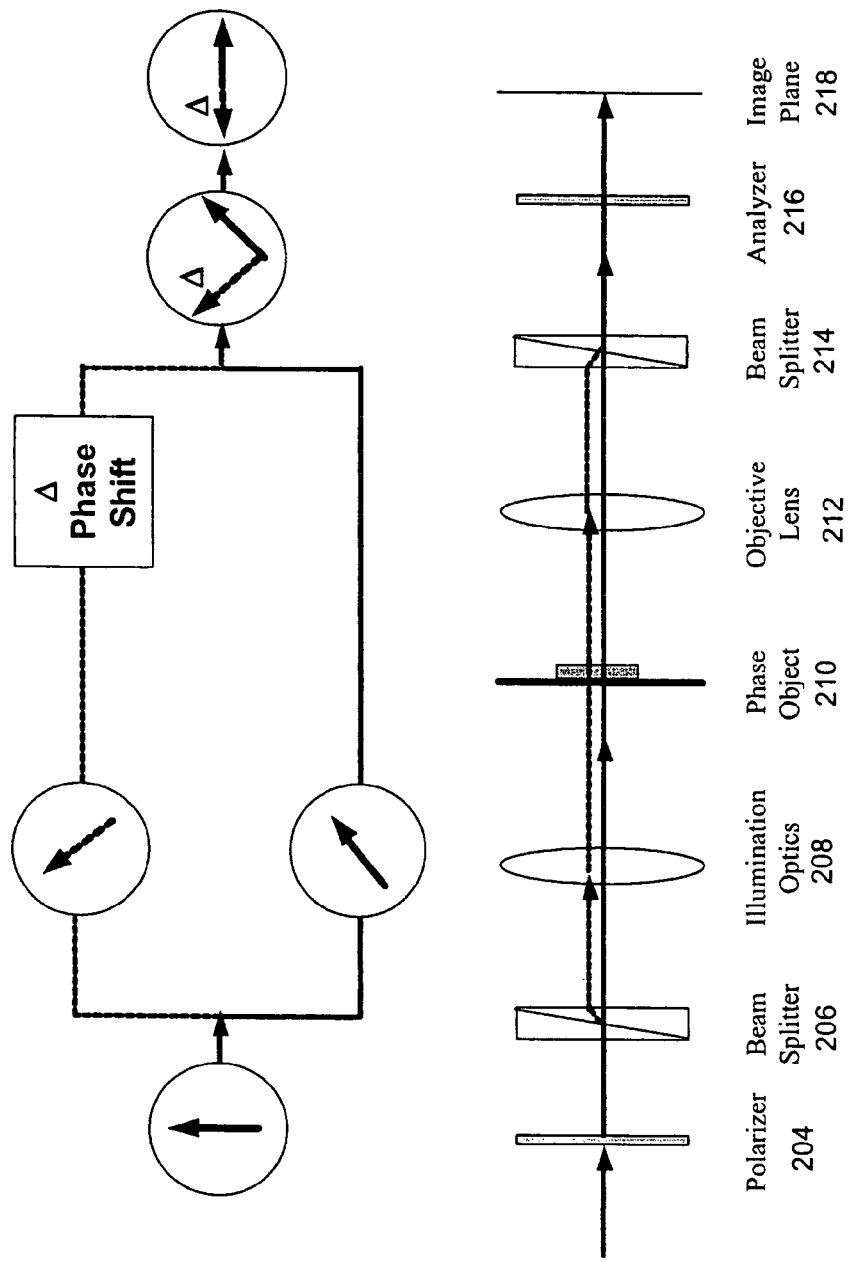
FIG. 2 (prior art) shows ray paths and polarization states for the Interference Contrast imaging system of FIG. 1.

The locations of polarizer, analyzer, and beam splitters of FIG. 3 have been chosen because of historical reasons. These are the traditional locations for these components in prior art systems relative to the illumination and imaging optics. The same relative locations are seen in FIG. 1. The beam splitter 314 and analyzer 316 can theoretically be moved relative to objective lens 312 without changing the imaging behavior of the system. See system 400A of FIG. 4. Numbering conventions of FIG. 4 are also similar to those of FIGS. 1 and 3 due to the similar nature of the components. In system 400A the beam splitter and analyzer have been moved before the objective lens but after the object. The wavefront after analyzer 416 is polarized as is the wavefront after analyzers 216 and 316 in FIGS. 2 and 3 respectively. Since, ideally, lenses do not change the polarization, shear, or bias of the wavefront this new location is technically equivalent to that of FIG. 3. Consider the ray paths of FIG. 2. Notice that the ray paths between beam splitters 206 and 214 are parallel. Moving beam splitter 206 before objective lens 212 theoretically will not change the parallel nature of the ray paths. Analyzer 216 can also move before objective lens 212 with no adverse affects. The component arrangement of system 400A allows the "Object Modifying Functions" to be clearly distinguished from the Object Imaging Functions.

In order to further characterize the Object Modifying Function of system 400A consider system 400B of FIG. 4. In this system a new phase and amplitude object 410B replaces the original object 410A of system 400A. This new object is selected so that its three dimensional structure produces an identical wavefront from illumination source 402, polarizer 404, and illumination optics 408 as from object 410A when combined with the polarizer, analyzer, and beam splitters of system 400A. It is well known that a phase and amplitude object can be theoretically constructed so that any given linearly polarized wavefront can be reproduced from linearly polarized illumination. Although it is theoretically possible to produce such a new object 410B, in practice it might be difficult. Since a new object 410B can be substituted for the combination of original object 410A, beam splitter 406, beam splitter 414, and analyzer 416, it is clear that the polarizers and analyzers act to modify the imaging characteristics of the object. Notice that the right sides of systems 400A and 400B are identical. The right sides of these systems are the Object Imaging Function. The Object Imaging Function images the object that has had its imaging characteristics modified by the Object Modifying Function. With the Wavefront Coding optical element 424 and image processing 426 the Object Imaging Function can have a very large depth of field and be able to control focus-related aberrations.

If the Object Imaging Function of system 400B has a large depth of field, then the New Object of 410B can be imaged over a large depth. Likewise, when the Object Imaging Function of system 400A has a large depth of field, object 410A (as modified by the Object Modifying Function) can be imaged with a large depth of field. Since system 400B produces identical images to system 400A, and system 400A produces identical images to system 300, this also means that system 300 will image object 310 with a large depth of field. This large depth of field is also independent of the object or Object Modifying Functions as shown in FIG. 4.

The Object Imaging Function can be made to have a large depth of field by use of a generalized aspheric optical element and signal processing of the detected images. Ambiguity function representations can be used to succinctly describe this large depth of field. Only the magnitude of the ambiguity functions in this and following figures are shown. Ambiguity functions are, in general, complex functions. One-dimensional systems are given for simplicity. Those skilled in the art of linear systems and ambiguity function analysis can quickly make extensions to two-dimensional systems. An ambiguity function representation of the optical system is a powerful tool that allows modulation transfer functions ("MTFs") to be inspected for all values of misfocus at the same time. Essentially, the ambiguity function representation of a given optical system is similar to a polar plot of the MTF as a function of misfocus. The in-focus MTF is described by the trace along the horizontal v=0 axis of the ambiguity function. An MTF with normalized misfocus value of $\Psi=(2\pi/\lambda)W_{20}$, where $W_{20}$ is the traditional misfocus aberration coefficient and $\lambda$ is the illumination center wavelength, is described in the ambiguity function along the radial line with slope equal to ($\Psi$/pi). For more information on ambiguity function properties and their use in Wavefront Coding see "Extended Depth of Field Through Wavefront Coding", E. R. Dowski and W. T. Cathey, Applied Optics, vol. 34, no 11, pp.1859-1866, April, 1995, and references contained therein.

Figure 5:
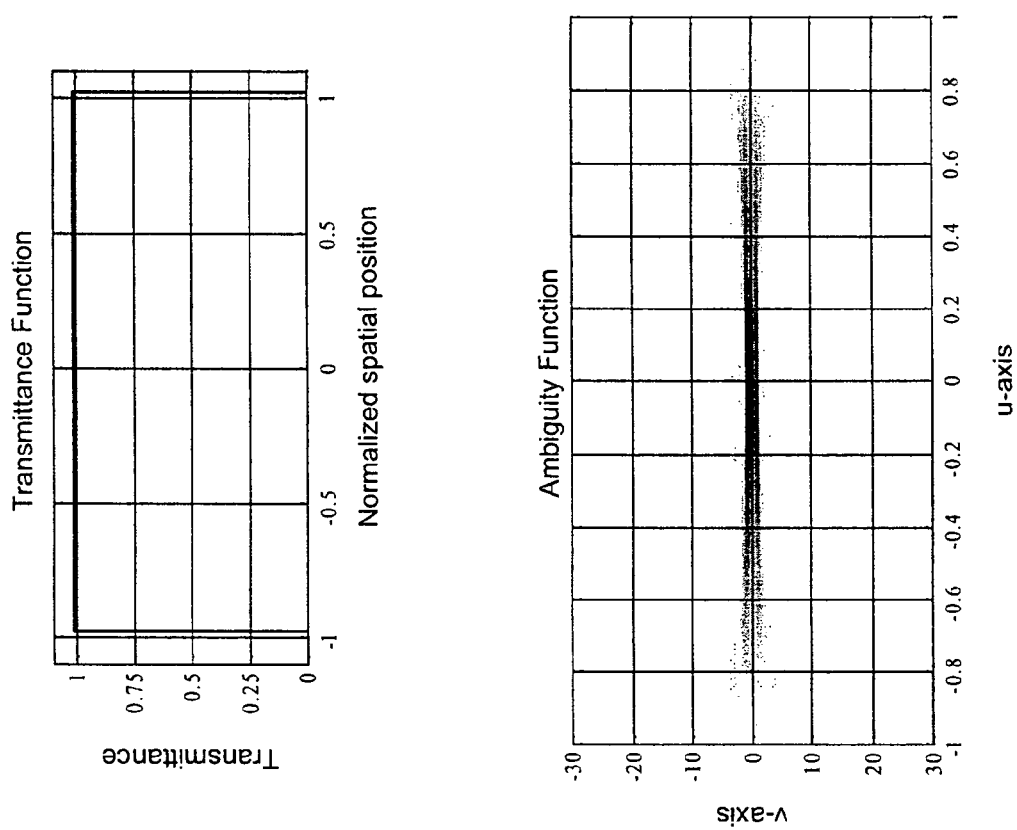
FIG. 5 shows the aperture transmittance function and the corresponding ambiguity function for the Object Imaging Function of the prior art system of FIG. 1.

FIG. 5 gives an ambiguity function perspective on the Object Imaging Function of conventional Interference Contrast systems. The top plot of FIG. 5 shows the aperture transmittance function of an ideal conventional Interference Contrast system such as that shown in FIG. 1. The bottom plot of FIG. 5 shows the associated ambiguity function associated with the Object Imaging Function for the prior art system of FIG. 1.

Over the normalized aperture (in normalized coordinates extending from −1 to +1) the conventional system has a transmittance of 1, i.e., 100%. The phase variation (not shown) is equal to zero over this range. The corresponding ambiguity function has concentrations of optical power (shown as dark shades) very close to the horizontal v=0 axis. From the relationship between the ambiguity function and misfocused MTFs, we see that the conventional Interference Contrast Systems has a small depth of field because slight changes in misfocus lead to MTFs (represented by radial lines with non-zero slope in the ambiguity function) that intersect regions of small power.

Figure 6:
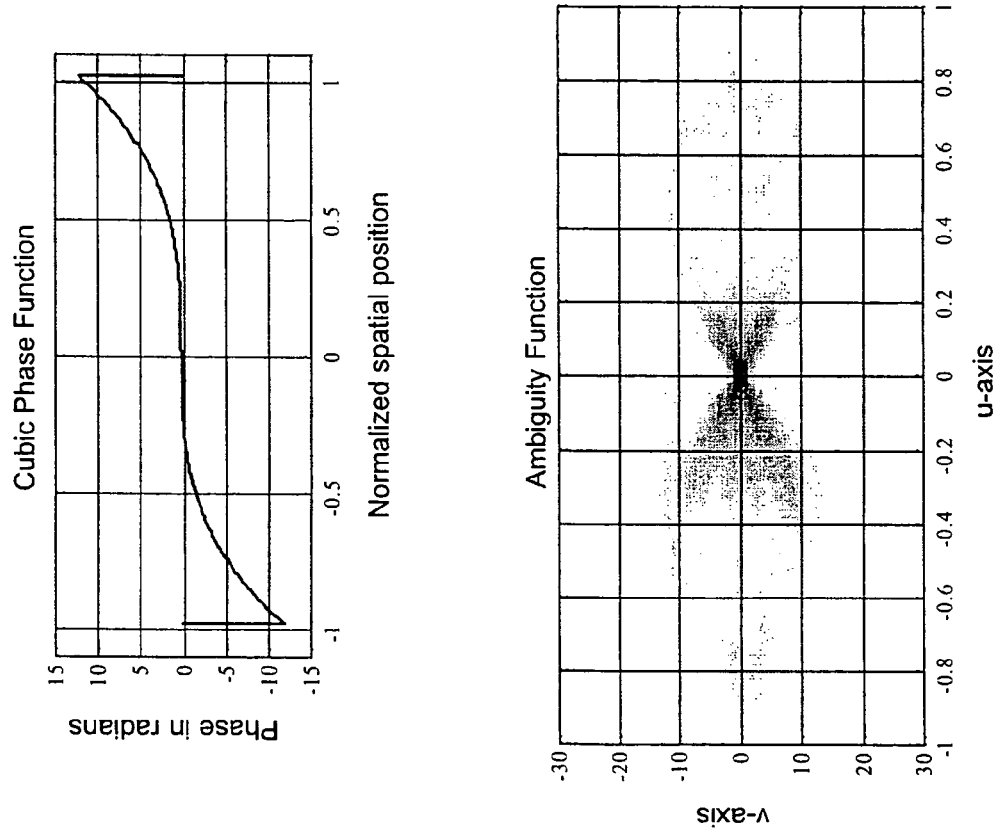
FIG. 6 shows the Wavefront Coded cubic phase function and the corresponding ambiguity function for the Object Imaging Function of FIG. 3.

FIG. 6 shows an example of a phase function for the Wavefront Coding optical element 324 and corresponding ambiguity function for an improved system of FIG. 3. This phase function is rectangularly separable and can be mathematically described in two dimensions as:

$$\text{Phase }(x,y)=12\ [x^3+y^3]/|x|\leq 1,\ |y|\leq 1.$$

Only one dimension of this phase function is shown in the upper plot of FIG. 6. Increasing the peak-to-valley phase height (as can be done by increasing the constant 12 above), results in increasing depth of field. The transmittance of this system (not shown) is unity (i.e., 100%) over the entire aperture, as in the top plot of FIG. 5.

The ambiguity function shown in FIG. 6 for this Wavefront Coded Interference Contrast system is seen to have optical power spread over a much larger region in the ambiguity domain than does the diffraction-limited system plotted in FIG. 5. Broader regions of optical power in the ambiguity function translate to larger depth of field or depth of focus since the ambiguity function is essentially a radial plot of misfocused MTFs with the angular dimension pertaining to misfocus. Thus, this Wavefront Coded Interference Contrast system has a larger depth of field than the conventional Interference Contrast system.

There are an infinite number of different Wavefront Coding phase functions that can be used to extend the depth of field. Other more general rectangularly separable forms of the Wavefront Coding phase function are given by:

$$\text{phase}(x,y)=\Sigma\ [a_i\ \text{sign}(x)|x|^{b_i}+c_i\ \text{sign}(y)|y|^{d_i}]$$

where the sum is over the index i, $$\text{sign}(x)=-1\text{ for }x<0,\ \text{sign}(x)=+1\text{ for }x\geq 0.$$

Rectangularly separable forms of Wavefront Coding allow fast processing. Other forms of Wavefront Coding complex phases are non-separable, and the sum of rectangularly separable forms. One non-separable form is defined as:

$$\text{phase}(r,\theta)=\Sigma\ [r^{a_i}\cos(b_i\theta+\phi_i)]$$

where the sum is again over the index i.

Figure 7:
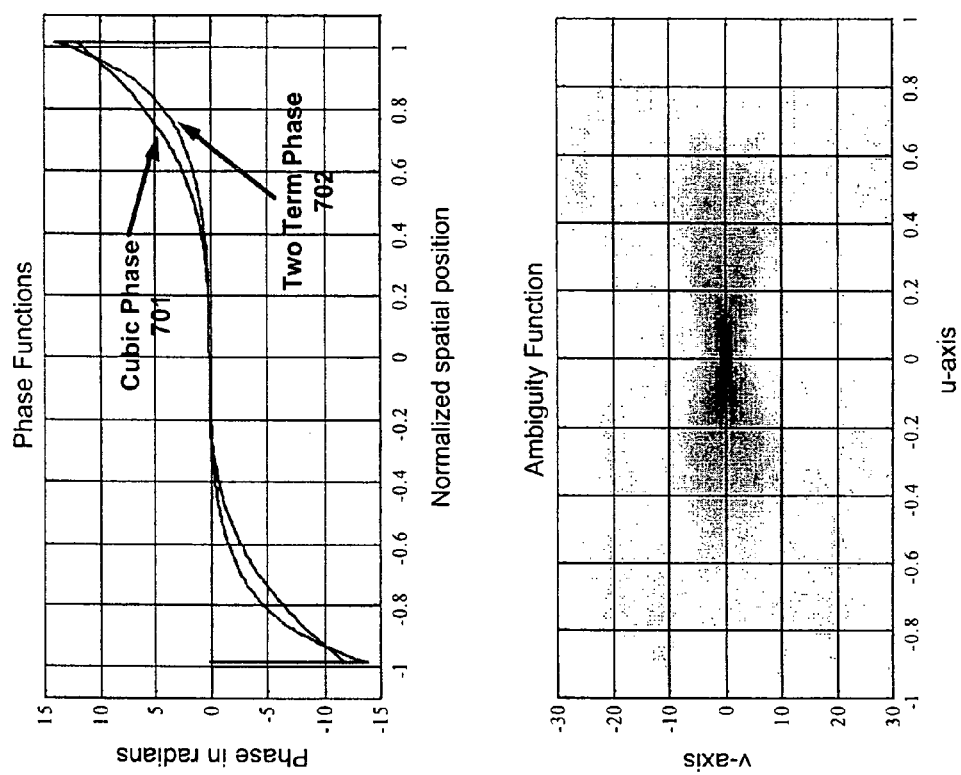
FIG. 7 shows another Wavefront Coded phase function and the corresponding ambiguity function for the Object Imaging Function of FIG. 3.

FIG. 7 shows the Wavefront Coding phase function and the ambiguity function for a further improved system of FIG. 3. The top plot of FIG. 7 shows the phase function from FIG. 6 (curve 701) and a further improved phase function (curve 702). The aperture transmittance function is the same as shown in FIG. 5. The form of the new phase profile 702, in radians, of this system is given by:

$$\text{Phase profile }(x,y)=7[\text{sign}(x)|x|^3+\text{sign}(y)|y|^3]+\ 7[\text{sign}(x)|x|^{9.6}+\text{sign}(y)|y|^{9.6}]$$

where $|x|\leq 1$, $|y|\leq 1$.

The ambiguity function related to phase function 702 is shown in the bottom of FIG. 7. This ambiguity function is seen to have more optical power uniformly spread about the horizontal v=0 axis when compared to either the Wavefront Coding Interference Contrast system plotted in FIG. 6 or the Conventional Interference Contrast system plotted in FIG. 5. Thus, the Wavefront Coded Interference Contrast system of FIG. 7 will have a larger depth of field than the systems represented in FIGS. 6 or 5.

Figure 8:
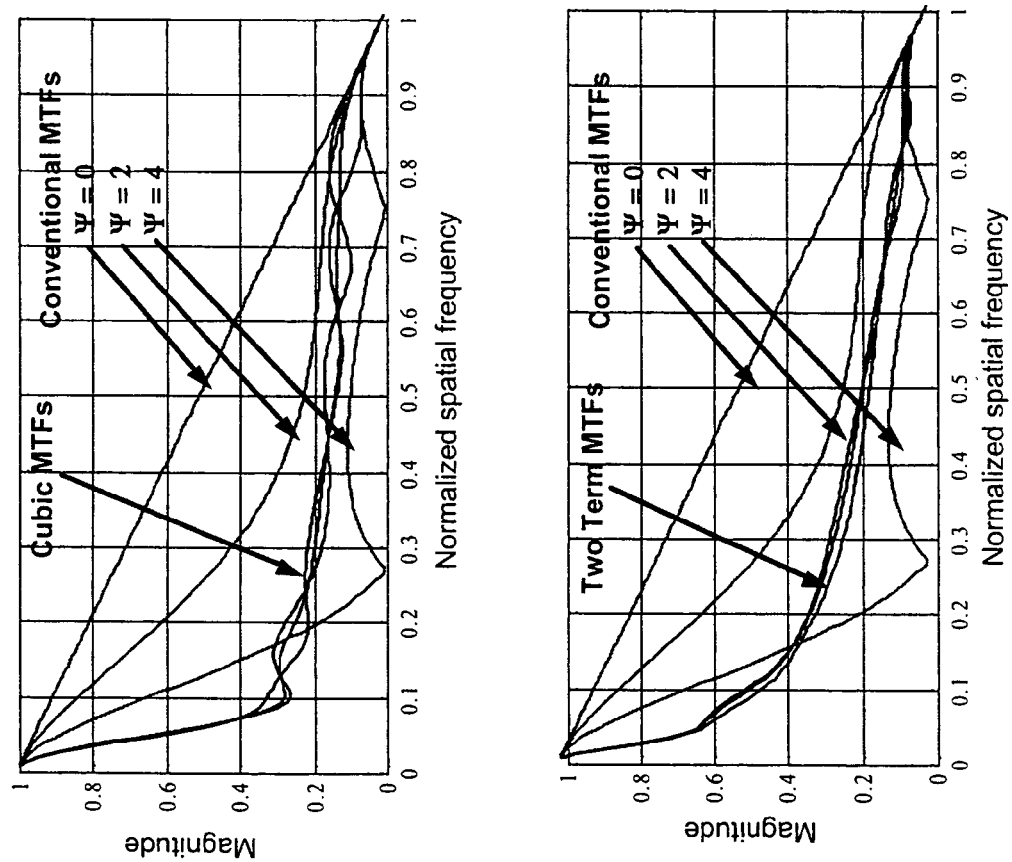
FIG. 8 shows misfocus MTFs for the prior art Object Imaging Function of FIG. 1 and the Object Imaging Functions for the Wavefront Coded Interference Contrast systems described in FIGS. 3, 6 and 7.
Figure 9:
FIG. 9 shows single plane of focus images of human cervical cells with darkly stained nuclei imaged with a 40X, NA=1.3 objective with a conventional Interference Contrast system and with a Wavefront Coded Interference Contrast imaging system similar to that of FIG. 3.
Figure 9:

FIG. 8 shows MTFs as a function of misfocus for the prior art Interference Contrast system, and the Wavefront Coded Interference Contrast systems of FIGS. 6 and 7. The top plot of FIG. 8 shows the MTFs of the conventional Interference Contrast imaging system of FIG. 1 and FIG. 5 and the MTFs of the Wavefront Coded Interference Contrast system of FIG. 6. The bottom plot shows the MTFs of the Interference Contrast imaging system of FIGS. 1 and 5 (again) and the MTFs from the Wavefront Coding Interference Contrast imaging system of FIG. 7. These plots are the particular MTFs given in the respective ambiguity functions for the normalized misfocus values $\Psi=\{0, 2, 4\}$. Notice that the MTFs for the conventional Interference Contrast system (top and bottom plots) vary appreciably with even this slight amount of misfocus. The image from the conventional system will thus change drastically due to misfocus effects for only small, misfocus values. This is expected from the narrow ambiguity function associated with the conventional system (shown in FIG. 5).

By comparison, the MTFs from the Wavefront Coded Interference Contrast imaging systems (top and bottom plots) show very little change with misfocus as predicted by the ambiguity functions associated with these systems (shown in FIGS. 6 and 7). If the MTFs of the system do not change, the resulting MTFs (and hence also point spread functions, or "PSFs") can be corrected over a large range of misfocus with a single post processing step 326. A single post processing step is not possible with conventional systems, which change appreciably with misfocus since the MTFs and PSFs of the system change with misfocus to values that are unknown and often impossible in practice to calculate. The MTFs from the Wavefront Coded Interference Contrast system in the top plot are seen to have lower values for most spatial frequencies than the MTFs from the Wavefront Coded Interference Contrast system of the bottom plot. This is expected from the ambiguity functions of FIGS. 6 and 7 respectively. The two-term phase function (curve 702) yields MTFs that not only have similarly small change with misfocus but also give a higher MTF than those associated with the simple cubic phase function (curve 701). This higher MTF results in a more compact PSF (not shown) as well as less signal-to-noise ratio penalties needed for the image processing 326.

In general, the Wavefront Coded objective mask phase function that yields the smallest MTF variation with misfocus and also the highest MTF is preferred in practice. There are an infinite number of different objective mask phase functions that are good candidates for control of the MTF. The characteristics that practical Wavefront Coding mask phase functions have can generally be described as being relatively flat near the center of the aperture with increasing and decreasing phase near the respective edges of the aperture. The central portion of the phase function controls the majority of the light rays that would not need modification if the objective were stopped down, for the depth of field extension required. For increasing amounts of depth of field, the size of the central phase region that can be flat decreases. Increasing the flatness of the central region of the rays leads to larger MTFs as seen in comparison to the phase functions and MTFs of FIGS. 6, 7, and 8. The edge portion of the phase function controls the light rays that increase the light gathering and spatial resolution of the full aperture system but, without modification, cause the largest amount of misfocus effects in traditional systems. It is these edge rays that should be modified most by the objective mask phase function because they control the variation of the MTFs and PSFs with misfocus. The actual modification made to these edge rays should position them so that the sampled PSFs and MTFs are maximally insensitive to changes in misfocus.

Notice that the MTFs from the Wavefront Coding Interference Contrast system of FIG. 8 (upper and lower plots) essentially do not change with misfocus but also do not have the same shape as that of the in-focus MTF ($\Psi=0$) of the conventional Interference Contrast system. In the spatial domain, the Wavefront Coding Interference Contrast systems form images with a specialized blur where the blur is insensitive to the amount of misfocus. The Image Processing function 326 is used to remove-this blur. The Image Processing function can be designed so that after processing the MTFs and PSFs of the combined Wavefront Coding Interference Contrast system, over a range of misfocus, closely match that of the in-focus Interference Contrast system. The Image Processing function can also produce an effective MTF that has more or less contrast than the in-focus Interference Contrast system, depending on the needs of the particular application.

In essence, the image processing function restores the Wavefront Coding Interference Contrast transfer functions to those expected from the conventional Interference Contrast system with no misfocus. Since all the Wavefront Coding MTFs are essentially identical, after image processing 326 all MTFs (and hence all PSFs) will be nearly identical for each value of misfocus.

More specifically, the image processing function, say F, implements a transformation on the blurred Wavefront Coding Interference Contrast system, say $H_{WFC}$, so that after processing the system has an ideal response $H_{ideal}$. Typically the ideal response is chosen as the in-focus response from the general Interference Contrast system. If implemented as a linear filter, then F is (in the spatial frequency domain) equivalent to:

$$F(w)H_{WFC}(w)=H_{ideal}(w)$$

where w denotes a spatial frequency variable. If the ideal response is fixed then changing the Wavefront Coding Interference Contrast system $H_{WFC}$ changes the image processing function F. The use of a different Wavefront Coding phase function can cause a change in the image processing function.

In practice, it is common to be able to measure slight changes in the Wavefront Coding Interference Contrast system as a function of misfocus. In this case the image processing F is chosen as a best fit between the measured data and the desired system after processing.

There are many linear and non-linear prior art techniques for removing known and unknown blur in images. Computationally effective techniques include rectangularly separable or multi-rank linear filtering. Rectangularly separable linear filtering involves a two step process where the set of one-dimensional columns are filtered with a one-dimensional column filter and an intermediate image is formed. Filtering the set of one-dimensional rows of this intermediate image with a one-dimensional row filter produces the final image. Multi-rank filtering is essentially the parallel combination of more than one rectangularly separable filtering operation. A rank N digital filter kernel can be implemented with rectangularly separable filtering by using N rectangularly separable filters in parallel.

The form of the processing (rectangularly separable, multi-rank, 2D kernel, etc.) is matched to that of the Wavefront Coding element. Rectangularly separable filtering requires a rectangularly separable Wavefront Coding element. The element described in FIG. 6 is rectangularly separable.

FIG. 9 contains real world images of human cervical cells made with a conventional Interference Contrast system and a Wavefront Coded Interference Contrast System. The image on the left of FIG. 9 was made with a conventional 40X, NA=1.3 Interference Contrast system similar to that of FIG. 1. The image on the right of FIG. 9 was made with a Wavefront Coding Interference Contrast system similar to that of FIG. 3. The Wavefront Coding Element 324 was a rectangularly separable cubic phase element. Rectangularly separable digital filtering was used for image processing 326.

Notice the phase shading visible in the conventional image. This phase shading results in a 3D-like appearance of the object. This is a characteristic of Interference Contrast imaging. Notice also that many parts of the Interference Contrast images are blurred due to misfocus effects. The bottom part of the left image, for example, is particularly badly blurred by misfocus. The Wavefront Coded Interference Contrast image is also seen to have similar phase shading and 3D-like appearance as the conventional image. The depth of field visible in the image is much larger in the Wavefront Coded image than in the conventional image. Many parts of the cells that could not be resolved in the conventional image are clearly visible in the Wavefront Coding image. Thus, the Wavefront Coding Interference Contrast image produces both the characteristic Interference Contrast phase object imaging characteristics and a large depth of field.

As shown in FIGS. 6 through 9, the Wavefront Coding Interference Contrast imaging system removes the effects of misfocus on the final images. The Wavefront Coding Interference Contrast system will control the misfocus effects independent of the source of the misfocus. When increasing the depth of field, as shown in FIG. 9, the misfocus effects are produced from the object or parts of the object not being in the best focus position relative to the imaging optics. Misfocus effects can also be produced by non-ideal optics, temperature changes, mechanical positioning errors, and similar causes that lead to optical aberrations. Controlling misfocus effects besides those related to object positioning allows inexpensive systems to be produced that image with a high quality. For example, if the objective lens 312 of FIG. 3 has a noticeable amount of chromatic aberration then misfocus effects will be produced as a function of illumination wavelength. The Wavefront Coding Interference Contrast system can control the chromatic aberration misfocus effects while also extending the depth of field. Other optical aberrations that can similarly be controlled include petzval curvature, astigmatism, spherical aberration, temperature related misfocus, and fabrication or alignment related misfocus. Many other aberrations in prior art systems may be improved in Wavefront Coding Interference Contrast systems.

What is claimed is:

1. In a method for imaging a phase object utilizing an interference contrast imaging system, the system having an illumination source, an optical element for dividing light polarizations, illumination optics, an optical element for recombining the light polarizations, and objective optics to form an image at a detector, the system characterized by an unaltered optical transfer function, the improvement comprising:
    configuring at least one of the optical elements and the optics of the interference contrast imaging system for encoding a wavefront transmitted therethrough to produce an altered optical transfer function of the interference contrast imaging system that is substantially insensitive to an object distance between the phase object and the objective optics over a greater range of object distances as compared to the unaltered optical transfer function.

2. In the method of claim 1, the further improvement wherein encoding the wavefront comprises imparting a phase shift to the wavefront.

3. In the method of claim 2, the further improvement wherein imparting the phase shift further comprises effecting a cubic phase function.

4. In the method of claim 2, the further improvement comprising processing the image to remove the phase shift.

5. In the method of claim 1, the further improvement wherein configuring comprises designing at least two of (a) the optical element for dividing light polarizations, (b) the optical element for recombining the light polarizations and (c) the objective optics, to cooperate to encode the wavefront.

6. A method for increasing depth of field in an interference contrast imaging system for imaging a phase object, the system having an illumination source, an optical element for dividing light polarizations, illumination optics, an optical element for recombining light polarizations, and objective optics to form an image at a detector, the system characterized by an unaltered optical transfer function, the method comprising:
    configuring at least a selected one of the optical elements and the optics of the interference contrast system to produce an altered optical transfer function of the interference contrast imaging system that is substantially insensitive to a distance between the phase object and the objective optics over a greater range of object distances as compared to the unaltered optical transfer function,
    wherein configuring comprises customizing the selected one of the optical elements for imparting a phase shift to the wavefront.

7. The method of claim 6, further comprising post processing the image to remove the phase shift.

8. The method of claim 6, wherein configuring comprises utilizing at least two of the optical elements and the objective optics to impart the phase shift.

9. An interference contrast imaging system for imaging a phase object, comprising:
    an illumination source for providing illumination;
    first polarizing optics for splitting the illumination into orthogonal polarizations;
    illumination optics;
    second polarizing optics for recombining the orthogonal polarizations;
    a detector;
    objective optics to form an image at the detector; and
    a wavefront coding element having an aperture and placed between the phase object and the detector, the wavefront coding element being constructed and arranged to provide an altered optical transfer function of the imaging system by imparting a phase shift to the illumination transmitted through the wavefront coding element, the altered optical transfer function being insensitive to an object distance between the phase object and the objective optics over a greater range of object distances than would be provided by an unaltered optical transfer function of a corresponding interference contrast imaging system without the wavefront coding element; and
    a post processing element for processing the image by removing the phase shift imparted by the wavefront coding element.

10. System of claim 9, the wavefront coding element being integrally formed with at least a selected one of the first beam splitter, the second beam splitter, and the objective optics.

* * * * *